(12) United States Patent
Gould et al.

(10) Patent No.: US 10,076,909 B2
(45) Date of Patent: Sep. 18, 2018

(54) PRINTING INK

(71) Applicant: FujiFilm Speciality Ink Systems Limited, Broadstairs Kent (GB)

(72) Inventors: Nigel Gould, Broadstairs Kent (GB); Christopher Daniel, Broadstairs Kent (GB)

(73) Assignee: Fujifilm Specialty Ink Systems Limited (GB)

( * ) Notice: Subject to any disclaimer, the term of this patent is extended or adjusted under 35 U.S.C. 154(b) by 10 days.

(21) Appl. No.: 15/313,924

(22) PCT Filed: Jun. 12, 2015

(86) PCT No.: PCT/GB2015/051738
§ 371 (c)(1),
(2) Date: Nov. 23, 2016

(87) PCT Pub. No.: WO2015/189639
PCT Pub. Date: Dec. 17, 2015

(65) Prior Publication Data
US 2017/0197423 A1    Jul. 13, 2017

(30) Foreign Application Priority Data

Jun. 12, 2014 (GB) .................................. 1410512.6
Dec. 1, 2014 (GB) .................................. 1421309.4

(51) Int. Cl.
| | | |
|---|---|---|
| *C08F 2/50* | (2006.01) | |
| *C08F 2/46* | (2006.01) | |
| *B41J 2/175* | (2006.01) | |
| *C09D 11/322* | (2014.01) | |
| *C09D 11/101* | (2014.01) | |
| *C09D 11/102* | (2014.01) | |
| *C09D 11/38* | (2014.01) | |

(52) U.S. Cl.
CPC .......... *B41J 2/17503* (2013.01); *C09D 11/101* (2013.01); *C09D 11/102* (2013.01); *C09D 11/322* (2013.01); *C09D 11/38* (2013.01)

(58) Field of Classification Search
CPC .. B41J 21/17503; C09D 11/101; C09D 11/38; C09D 11/102; C09D 11/322

USPC .......... 522/84, 83, 71, 1, 189, 184, 6; 520/1
See application file for complete search history.

(56) References Cited

U.S. PATENT DOCUMENTS

| | | | |
|---|---|---|---|
| 6,443,569 B1 | 9/2002 | Mheidle et al. | |
| 2002/0198289 A1* | 12/2002 | Gummeson | C09D 11/101 523/400 |
| 2015/0203697 A1* | 7/2015 | Brandstein | C09D 11/101 347/20 |

FOREIGN PATENT DOCUMENTS

| | | | | |
|---|---|---|---|---|
| CN | 102 382 507 B | 12/2013 | | |
| EP | 1 469 049 A1 | 10/2004 | | |
| EP | 2 703 458 A1 | 3/2014 | | |
| EP | 2 787 046 A1 | 10/2014 | | |
| EP | 2 960 306 A1 | 12/2015 | | |
| GB | 2 314 851 A | 1/1998 | | |
| JP | 2000 119574 A | 4/2000 | | |
| WO | 02/064689 A2 | 8/2002 | | |
| WO | 2012/022962 A1 | 2/2012 | | |
| WO | WO-2012022962 A1 * | 2/2012 | .......... | C09D 11/101 |
| WO | 2013/083956 A1 | 6/2013 | | |
| WO | WO-2013083956 A1 * | 6/2013 | .......... | C09D 11/101 |

OTHER PUBLICATIONS

International Search Report for corresponding application No. PCT/GB2015/051738 dated May 2, 2016.
Third-party observations filed against corresponding European Application No. 15794956.1 dated Aug. 25, 2017 and English language translation thereof.

* cited by examiner

*Primary Examiner* — Jessica Whiteley
(74) *Attorney, Agent, or Firm* — Wood, Phillips, Katz, Clark & Mortimer

(57) ABSTRACT

The present invention provides an inkjet ink comprising: an aqueous polyurethane (meth)acrylate dispersion, which is redispersible in water after thermal drying and before curing; a water-dispersible or water-soluble photoinitiator; a surfactant; and a coloring agent. The ink of the present invention is particularly suitable for printing onto a food packaging.

11 Claims, No Drawings

PRINTING INK

FIELD OF THE INVENTION

The present invention relates to a printing ink and in particular to a printing ink for printing onto a food packaging.

BACKGROUND OF THE INVENTION

There is a growing interest in the printing industry for digital printing of inks onto containers and labels. Typical digital printing currently employed includes gravure and flexographic printing. However, such printing processes have the disadvantage of an arduous set up which means that the economic running time limits the possibility of short runs and limits customisation of the printed products.

Inkjet printing is an ideal process in order to overcome such issues on account of its flexibility and ease of use. However, inks, which are suitable for use in inkjet printing, can cause problems when applied to a food packaging substrate.

In this respect, food packaging represents a particular challenge on account of the strict safety limitations on the properties of materials, which come into contact with food, including indirect additives like packaging inks. For printed food packaging, it is necessary to control and quantify the migration and/or odour of the components of the printed image on the food packaging into the food products. Specific exclusions based on their odour and/or migration properties include volatile organic solvents and many monomers typically used in UV curing inks.

Printing using UV curing inks, which comprise reactive monomers, is dependent on the dose of UV radiation directed at the printed film to effect polymerisation of the reactive components in the ink. This has a major influence on the levels of unreacted residual monomer.

In gravure and flexographic printing, the issues of migration of components and malodour of UV curing inks in food packaging are overcome by formulating inks having (meth) acrylate monomers with at least three (meth)acrylate groups per molecule. This high level of (meth)acrylate functionality maximises the likelihood that the monomer will be incorporated into a growing polymer chain, thus making it unavailable to migrate into the foodstuff. This is not possible for inkjet inks as the higher functionality monomers cannot be used as the sole monomer in UV inkjet inks owing to their high viscosity. In this respect, inks suitable for inkjet printing typically need a low viscosity, preferably below 25 mPas at jetting temperature. It is thus necessary to blend the inks with lower viscosity materials, which can compromise the migration/odour characteristics of the printed film.

A potential solution to this problem is to include a solvent into the ink composition to reduce the viscosity, as disclosed in WO 2013/093414. WO 2013/093414 discloses compositions comprising high molecular weight (greater than 1,000 Daltons) multifunctional (meth)acrylate oligomers diluted with an organic solvent. Materials with molecular weights of over 1,000 Daltons are widely recognised as being too large to pass through cell membranes and hence it is desirable to use such components in inks for use in the food packaging industry. However, although this is solution to the problem of controlling the potential for migration of (meth)acrylate materials into foodstuffs, it is essential that the organic solvent is fully removed during the drying and curing process. This is particularly problematic when using absorbent substrates. Of course, the use of a low toxicity alternative, namely water, as opposed to the organic solvent solves this issue. However, water-compatible (meth)acrylate functionalised radiation-curable material having a molecular weight of greater than 1,000 Daltons is required. The material also needs to yield films with good resistance properties and allow formulation of low viscosity compositions. This is problematic in aqueous systems where hydrogen bonding can give rise to high viscosity solutions even with relatively low molecular weight species.

There is therefore a need in the art for inkjet inks which can be printed directly onto food packaging, have low odour and migration properties, the required viscosity, without compromising the physical film properties required, such as chemical and scratch resistance.

BRIEF SUMMARY OF THE INVENTION

Accordingly, the present invention provides an inkjet ink comprising: an aqueous polyurethane (meth)acrylate dispersion, which is redispersible in water after thermal drying and before curing; a water-dispersible or water-soluble photoinitiator; a surfactant; and a colouring agent.

It has surprisingly been found that aqueous polyurethane (meth)acrylate dispersions (PUDs) can be used to formulate UV curable inkjet inks that exhibit both the physical film properties required, such as chemical and scratch resistance, but, still have the desired low migration/odour properties and viscosity required for inkjet application.

DETAILED DESCRIPTION OF THE INVENTION

Aqueous PUD in dispersed form is a high molecular weight material suspended in an aqueous continuous phase and, as such, the viscosity and molecular weight are largely decoupled. PUDs are known for application in the wood-coating industry. However, PUDs for the wood industry need to dry to a resilient film via water loss during an initial thermal drying process. This limits potential for damage during transportation of coated materials prior to (UV) cure which gives a final boost to the film toughness and chemical resistance. However, this physical drying prior to (UV) cure is highly undesirable for the inkjet process and would lead to inks drying into printhead nozzles that would become permanently blocked. Unlike PUDs designed for use in the wood-coating industry, dispersible aqueous PUDs suitable for the present invention are redispersible in water after thermal drying and before (UV) curing meaning that it is easier to clean the inkjet printer. This property allows removal of any ink deposits from inkjet printheads that may build up during the printing process. The ink deposits are easily removable by water after thermal drying and before curing without the formation of solid particulates that could block the printhead nozzles.

The ink of the invention comprises an aqueous polyurethane (meth)acrylate dispersion (PUD). The PUD of the invention is aqueous. It is redispersible in water after thermal drying and before curing.

It should be noted that resolubility and resoluble are terms often used in the art to mean redispersibility and redispersible, respectively.

In the present invention, redispersibility of the ink in water after thermal drying and before curing is controlled by the selection of the PUD. As discussed hereinabove, PUDs are characterised by their physical drying properties. Most PUDs dry to a highly resilient film solely by water loss, where the final UV curing stage is only required to increase the final chemical resistance of the film. This characteristic makes the majority of PUDs unsuitable for inkjet application.

The test to measure the suitability of an aqueous PUD for use in the ink of the present invention involves measuring the redispersibility of a PUD in water after thermal drying and before curing. In order to measure the redispersibility of a PUD in water after thermal drying and before curing, the aqueous PUD under test is blended with an aqueous pigment dispersion, such as Projet APD 1000 cyan pigment dispersion (available from Fujifilm imaging colorants) or Diamond D71C cyan pigment dispersion (available from Diamond dispersions), to facilitate observation of film redispersion and removal. A surfactant, such as fluoro surfactants Capstone FS31, Capstone FS30 or Capstone FS34 (available from Dupont), is added to reduce surface tension and to allow wetting onto a suitable test substrate. After mixing the components, the composition is coated onto a suitable test substrate to produce a wet film. The wet film is thermally dried and then cooled to room temperature. Redispersibilty of the thermally dried ink film in water can then be assessed by a water rub test.

The water rub test is well known in the art. One takes a lint-free (cotton) cloth saturated in water. One then carries out a single rub where the saturated cloth is applied to one side of the dried PUD film and under light pressure, traverses the length of the dried PUD film in a single stroke. In order for the PUD to be suitable for use in the present invention, the PUD must be dispersible in water after thermal drying and before curing. Put another way, the PUD film should be cleanly removed from the substrate surface leaving no residual staining visible to the naked eye after a single rub. The presence of the pigment in the film helps to determine if this requirement has been met as the substrate should become visible when the colour is removed. Further, no particulate matter visible to the naked eye should be transferred to the wiping cloth or to the substrate at the end of the wiping area.

Therefore, in a preferred embodiment, the PUD of the invention after thermal drying and before curing can be redispersed in water in a single rub of the water rub test.

A PUD is water-dispersible after thermal drying and before curing if it maintains its water sensitivity/compatibility after thermal drying and before curing. In order to maintain this water sensitivity/compatibility in a PUD after thermal drying and before curing, it is necessary to maintain a water-sensitive functionalised PUD after thermal drying and before curing. Such functionality must be water-sensitive and therefore hydrophilic, and often includes ionic groups. An example of a PUD having ionic functionality which is maintained after thermal drying and before curing is a PUD which has carboxylic acid functional groups which are neutralised with an alkali metal hydroxide, such as NaOH, to produce a metal salt. Such a PUD maintains water dispersibility after thermal drying and before curing because the PUD salt is stable and compatible with water. An example of a PUD having non-ionic functionality which maintains oxygen functionality after thermal drying and before curing is a PUD having non-ionic blocks in the PUD chain of the polymer, such as polyether blocks.

Such redispersibility of the PUD in water after thermal drying and before curing allows for easy cleaning of the nozzles of an inkjet printer.

A PUD is not water-dispersible after thermal drying and before curing if it has reduced water sensitivity/compatibility after thermal drying. This occurs if the water-sensitive functional groups are lost during thermal drying of the ink to produce a thermally dried film. For example, in the case where a PUD has carboxylic acid functional groups and is neutralised with an amine salt as opposed to for example an alkali metal hydroxide, on thermal drying of an ink comprising such a functionalised PUD, this results in the breaking down of the amine salt. This amine salt is driven off during thermal drying and hence the ionic character of the PUD is lost and a PUD with carboxylic acid groups remains, which is not redispersible in water.

In the event that the PUD is not redispersible in water after thermal drying and before curing and therefore has lost its water sensitivity/compatibility after thermal drying, the dried film will not redisperse in water. This results in the production of shards of film, which is problematic in an inkjet nozzle.

Such PUDs for the present invention, which are redispersible in water after thermal drying and before curing, are available commercially, for example, from BASF. An example of preparing such a PUD is known in the art, see C. Y. Bai et al. "A new UV curable waterborne polyurethane: Effect of C=C content on the film properties", Progress in Organic Coatings, 2006, 55, 291-295.

The PUD which is redispersible in water after thermal drying and before curing preferably has a number average molecular weight of over 1,200 Daltons. In a preferred embodiment, the PUD has a number average molecular weight of 1,200 to 20,000, preferably 1,500 to 10,000, and most preferably 2,500 to 5,000, as measured by Infinity 1260 supplied by Agilent technologies, using gel permeation chromatography calibrated against polystyrene standards.

Further, the aqueous PUD which is redispersible in water after thermal drying and before curing is in dispersed form and preferably has a particle size of less than 200 nm as measured by Zeta PALS provided by Brookhaven Instruments Corporation.

The aqueous PUD which is redispersible in water after thermal drying and before curing with actinic (preferably UV) radiation, is non-dispersible in water after curing with actinic (preferably UV) radiation. The aqueous PUD is crosslinkable when exposed to UV radiation as it is acrylate functionalised. This helps to provide the physical film properties required, such as chemical and scratch resistance.

Preferably, the ink of the present invention comprises 20 to 80%, more preferably 30 to 70% and most preferably 40 to 60% by weight of aqueous PUD which is redispersible in water after thermal drying.

The inks of the invention comprise water. The water may solely come from that already contained in the PUD or may be additionally and separately added water. The total amount of water present in the ink of the present invention is preferably 40 to 80%, more preferably 60 to 75% by weight based on the total weight of the ink.

The inks of the invention comprise at least one colouring agent. The colouring agent may be either dissolved or dispersed in the liquid medium of the ink.

Preferably the colouring agent is a dispersible pigment, of the types known in the art and commercially available such as under the trade-names Paliotol (available from BASF plc), Cinquasia, Irgalite (both available from Ciba Speciality Chemicals) and Hostaperm (available from Clariant UK). The pigment may be of any desired colour such as, for example, Pigment Yellow 13, Pigment Yellow 83, Pigment Red 9, Pigment Red 184, Pigment Blue 15:3, Pigment Green 7, Pigment Violet 19 and Pigment Black 7. Especially useful are black and the colours required for trichromatic process printing. Mixtures of pigments may be used.

In one aspect the following pigments are preferred. Cyan: phthalocyanine pigments such as Phthalocyanine blue 15.4. Yellow: azo pigments such as Pigment yellow 120, Pigment yellow 151, Pigment yellow 155 and Pigment yellow 74. Magenta: quinacridone pigments, such as Pigment violet 19 or mixed crystal quinacridones such as Cromophtal Jet magenta 2BC and Cinquasia RT-355D. Black: carbon black pigments such as Pigment black 7.

Pigment particles dispersed in the ink should be sufficiently small to allow the ink to pass through an inkjet nozzle, typically having a particle size less than 8 µm, preferably less than 5 µm, more preferably less than 1 µm and particularly preferably less than 0.5 µm.

The colorant is preferably present in an amount of 20% by weight or less, preferably 10% by weight or less, by weight. A higher concentration of pigment may be required for white inks, however, for example up to and including 30% by weight, or 25% by weight.

The inks may be in the form of an ink set comprising a cyan ink, a magenta ink, a yellow ink and a black ink (a so-called trichromatic set). The inks in a trichromatic set can be used to produce a wide range of colours and tones. Other inkjet ink sets may also be used, such as CMYK+white.

The ink of the present invention further comprises a water-dispersible or water-soluble photoinitiator. The free-radical, water-dispersible or water-soluble photoinitiator can be selected from any of those known in the art. For example, Irgacure 2959 and 2-hydroxy-1-{4-[2-(2-hydroxyethoxy) ethoxy]phenyl}-2-methylpropan-1-one (PM10028).

Preferably the photoinitiator is present in an amount of 1 to 20% by weight, preferably 2 to 5% by weight.

In the present invention, the surface tension of the ink is controlled by the addition of one or more surface active materials such as commercially available surfactants. Therefore, the ink of the present invention further comprises a surfactant. Surfactants are well known in the art and a detailed description is not required. Adjustment of the surface tension of the inks allows control of the surface wetting of the inks on various substrates, for example, plastic substrates. Too high a surface tension can lead to ink pooling and/or a mottled appearance in high coverage areas of the print. Too low a surface tension can lead to excessive ink bleed between different coloured inks. The surface tension is preferably in the range of 20-40 mNm$^{-1}$ and more preferably 25-35 mNm$^{-1}$.

Preferably the surfactant is present in an amount of 0.01 to 5% by weight.

The amounts by weight provided herein are based on the total weight of the ink.

The inkjet ink exhibits a desirable low viscosity (100 mPas or less, more preferably 50 mPas or less and most preferably 35 mPas or less at 25° C.).

The ink of the present invention preferably further comprises a humectant. This can be any material that acts to retain water in the system, which are well-known in the art. Examples of humectants suitable for the present invention are water-soluble polyols or glycols. For example glycerol, (poly)ethylene glycol, (poly)propylene glycol and the like. The most preferred humectant is 2-methyl 1,3 propanediol.

The ink of the present invention optionally comprises a thickener, more preferably a synthetic thickener to facilitate the adjustment of the ink viscosity. Thickeners and more specifically, synthetic thickeners, are well known in the art and a detailed description is therefore not required.

In one embodiment, the ink contains 0.1 to 5% thickener, more preferably 0.1 to 2% thickener, by weight based on the total weight of the ink.

In another embodiment, the ink is free from thickener.

In a preferred embodiment, the synthetic thickener when present, has Newtonian rheology. Preferably therefore, the synthetic thickener is not thixotropic and does not cause shear thinning of the ink. In a preferred embodiment, the thickener is a polyurethane thickener. Polyurethane thickeners are water-soluble polyurethane polymers which comprise the simultaneous presence of linear or branched polymers which contain hydrophilic segments (for example, polyether chains containing at least 5 alkylene oxide units, preferably ethylene oxide units), hydrophobic segments (for example, hydrocarbon segments containing at least 6 carbon atoms) and urethane groups. A preferred example of a thickener material for suitable for use in the present invention is Additol VXW 6360, which is a polyether polyurethane thickener partly dissolved in deionized water and butyl diglycol, having an active content 30%, supplied by Allnex.

Other components of types known in the art may be present in the ink to improve the properties or performance. These components may be, for example, defoamers, dispersants, synergists for the photoinitiator, stabilisers against deterioration by heat or light, reodorants, flow or slip aids, biocides and identifying tracers.

The ink of the present invention preferably comprises less than 2% by weight (meth)acrylate radiation-curable material with a number average molecular weight of less than 1,200 Daltons, preferably less than 1% by weight, based on the total weight of the ink, as measured by Infinity 1260 supplied by Agilent technologies, using gel permeation chromatography calibrated against polystyrene standards. These will typically be mono-, di- and multifunctional monomers.

The ink may be prepared by known methods such as stirring with a high-speed water-cooled stirrer, or milling on a horizontal bead-mill.

The printing is performed by inkjet printing, e.g. on a single-pass inkjet printer, for example for printing (directly) onto packaging, such as food packaging, or a multiple-pass printer where the image is built up in print swathes. The inks are dried and exposed to actinic (often UV) radiation to cure the ink. Evaporation of the water can occur simply by exposure of the inks to the atmosphere, but the inks may also be heated to accelerate evaporation. The exposure to actinic radiation may be performed in an inert atmosphere, e.g. using a gas such as nitrogen, in order to assist curing of the ink.

Accordingly, the present invention further provides a method of inkjet printing comprising the following steps: inkjet printing the ink as defined herein onto a substrate and, in either order, evaporating the water and exposing the ink to actinic radiation to cure the ink.

It should be noted that the terms "dry" and "cure" are often used interchangeably in the art when referring to radiation-curable inkjet inks to mean the conversion of the inkjet ink from a liquid to solid by polymerisation and/or crosslinking of the radiation-curable material. Herein, however, by "drying" is meant the removal of the solvent by evaporation and by "curing" is meant the polymerisation and/or crosslinking of the radiation-curable material. Further details of the printing, drying and curing process are provided in WO 2011/021052.

The present invention also provides a cartridge containing the inkjet ink as defined herein. It also provides a printed substrate having the ink as defined herein printed thereon. Suitable substrates are a food packaging. Food packaging is typically formed of flexible and rigid plastics (e.g. food-grade polystyrene and PE/PP films), paper and board (e.g. corrugated board).

Any of the sources of actinic radiation discussed herein may be used for the irradiation of the inkjet ink. A suitable dose would be greater than 200 mJ/cm$^2$, more preferably at least 300 mJ/cm$^2$ and most preferably at least 500 mJ/cm$^2$. The upper limit is less relevant and will be limited only by the commercial factor that more powerful radiation sources increase cost. A typical upper limit would be 5 J/cm$^2$. Further details of the printing and curing process are provided in WO 2012/110815.

The invention will now be described with reference to the following examples, which are not intended to be limiting.

EXAMPLES

Example 1 (Preparation of a Aqueous PUD Test Sample)

To determine the suitability of the PUD for use in the ink of the present invention the following method was used:

First, the PUD under test is blended with an aqueous pigment dispersion to facilitate observation of film redispersion and removal. A surfactant is added to reduce surface tension and to allow wetting onto a suitable test substrate. The PUD test composition therefore comprises the components as set out in Table 1.

TABLE 1

| Component | Quantity (weight %) |
|---|---|
| Test polyurethane acrylate dispersion | 89.9 |
| Projet APD 1000 Cyan pigment dispersion (available from Fujifilm imaging colorants) | 10.0 |
| Capstone FS31 fluoro surfactant (available from Dupont) | 0.1 |

The components of Table 1 are accurately weighed into a mixing vessel and stirred with a flat bladed impeller stirrer at 800 rpm for 20 minutes to ensure the composition is fully homogeneous. After mixing, the composition is allowed to stand for 24 hours to deaerate.

The PUD test composition is then coated onto a 220 micron gloss PVC (Genotherm, as supplied by Klockner Pentaplast) using a number 2 K bar. A wet film is deposited of approximately 12 microns.

The ink film is then dried by placing in an oven set at 60° C. for three minutes.

When the ink film has cooled to room temperature, the redispersibility of the thermally dried ink film is assessed. In this respect, the corner of a sheet of E Tork paper towel (supplied by Tork UK) is wetted with 1 ml of deionised water and placed over the tip of the index finger. The wetted corner of the paper towel is brought into contact with the thermally dried PUD film at the left hand side of the printed film and drawn across the printed film in single stroke with a light pressure. The stroke is continued until the wetted paper towel has completely traversed the printed film In this case, the ink film is cleanly removed from the substrate surface leaving no residual staining visible to the naked eye. Further, there is no particulate matter, visible to the naked eye, transferred to the wiping paper or to the substrate at the end of the wiping area.

Example 2 (Ink)

An ink, as detailed in Table 2, was prepared by mixing the components in the given amounts using a serrated impeller-type stirrer until homogenous. Amounts are given as weight percentages based on the total weight of the ink.

TABLE 2

| Component | Supplier/material type | Amount (weight %) |
|---|---|---|
| GM0868-VP | BASF/Polyurethane (meth)acrylate dispersion | 55 |
| Water | — | 26.9 |
| PM10028* | Fujifilm/Water-soluble photoinitiator | 3 |
| 2-methyl 1,3 propanediol | Perstorp/Humectant | 5 |
| Capstone FS31 | Dupont/Fluorosurfactant | 0.1 |
| ProJet APD 1000 Cyan | Fujifilm/Aqueous pigment dispersion | 10 |

*PM10028 = 2-Hydroxy-1-{4-[2-(2-hydroxyethoxy)ethoxy]phenyl}-2-methylpropan-1-one The viscosity and surface tension of the ink of Table 2 were determined as detailed in Table 3.

TABLE 3

| Ink properties | |
|---|---|
| Viscosity | 18.9 mPas |
| Surface Tension | 38.75 mN/m |

The ink of Table 2 was drawn down onto a 200 micron gloss PVC substrate using a no. 2 K bar applicator depositing a 12 micron wet film. The film was thermally dried by placing the print into an oven set at 60° C. for three minutes. The redispersibility of the thermally dried film was checked by wiping a soft cloth soaked in water across the surface. Finally, the print was UV cured by running the print through a conveyorised UV drier fitted with one 120 W/cm medium pressure mercury lamp at 25 m/min. The film properties were assessed by its resistance to double rubs of a soft cloth soaked with A) water and B) isopropyl alcohol. The ink film properties are detailed in Table 4.

TABLE 4

| Ink film properties | |
|---|---|
| Film water redispersibility after thermal dry | 1 rub, film readily redispersible with no solid residue |
| Isopropyl alcohol resistance after UV cure | 100 + double rubs |
| Water resistance after UV cure | 100 + double rubs |

As can be seen from the properties of Table 4, any dried ink residue from the ink of Example 2 would be readily removed from the printhead nozzle plate by gentle cleaning with water. The ready dissolution of a dried ink film prevents the risk of blocking of jets with particulate matter.

Example 3 (Ink)

An ink, as detailed in Table 5, was prepared by mixing the components in the given amounts using a serrated impeller-type stirrer until homogenous. Amounts are given as weight percentages based on the total weight of the ink.

TABLE 5

| Component | Supplier/material type | Amount (weight %) |
|---|---|---|
| GM0868-VP | BASF/Polyurethane (meth)acrylate dispersion | 46.2 |

TABLE 5-continued

| Component | Supplier/material type | Amount (weight %) |
|---|---|---|
| Water | | 29.8 |
| Additol VXW 6360 | Allnex/Polyurethane thickener | 0.7 |
| PM10028* | Fujifilm/Water-soluble photoinitiator | 3 |
| 2-methyl 1,3 propanediol | Perstorp/Humectant | 5 |
| Capstone FS31 | Dupont/Fluorosurfactant | 0.3 |
| Projet APD 1000 Black pigment dispersion | Fujifilm/Aqueous pigment dispersion | 15 |

*PM10028 = 2-Hydroxy-1-{4-[2-(2-hydroxyethoxy)ethoxy]phenyl}-2-methylpropan-1-one The ink of Table 5 was drawn down onto a 200 micron gloss PVC substrate using a no. 2 K bar applicator depositing a 12 micron wet film. The film was thermally dried by placing the print into an oven set at 60° C. for three minutes. The redispersibility of the thermally dried film was checked by wiping a soft cloth soaked in water across the surface. Finally, the print was UV cured by running the print through a conveyorised UV drier fitted with one 120 W/cm medium pressure mercury lamp at 25 m/min. The film properties were assessed by its resistance to double rubs of a soft cloth soaked with A) water and B) isopropyl alcohol. The ink film properties are detailed in Table 6.

TABLE 6

| Ink film properties | |
|---|---|
| Film water redispersibility after thermal dry | 1 rub, film readily redispersible with no solid residue |
| Isopropyl alcohol resistance after UV cure | 100 + double rubs |
| Water resistance after UV cure | 100 + double rubs |

As can be seen from the properties of Table 6, any dried ink residue from the ink of Example 3 would be readily removed from the printhead nozzle plate by gentle cleaning with water. The ready dissolution of a dried ink film prevents the risk of blocking of jets with particulate matter.

Example 4 (Comparative Ink)

A comparative ink, as detailed in Table 7, was prepared by mixing the components in the given amounts using a serrated impeller-type stirrer until homogenous. Amounts are given as weight percentages based on the total weight of the ink.

TABLE 7

| Component | Supplier/material type | Amount (weight %) |
|---|---|---|
| Bayhydrol UV2689/1XP | Bayer/Polyurethane (meth)acrylate dispersion | 65.5 |
| Water | — | 15 |
| PM10028* | Fujifilm/Water-soluble photoinitiator | 3.0 |
| 2-methyl 1,3 propanediol | Perstorp/Humectant | 5 |
| Capstone FS31 | Dupont/Fluorosurfactant | 0.5 |
| Projet 1000 APD Cyan | Fujifilm/Aqueous pigment dispersion | 10 |

*PM10028 = 2-Hydroxy-1-{4-[2-(2-hydroxyethoxy)ethoxy]phenyl}-2-methylpropan-1-one The viscosity and surface tension of the ink of Table 8 were determined as detailed in Table 6.

TABLE 8

| Ink properties | |
|---|---|
| Viscosity | 9.8 mPas |
| Surface Tension | 38.25 mN/m |

The ink of Table 7 was drawn down onto a 200 micron gloss PVC substrate using a no. 2 K bar applicator depositing a 12 micron wet film. The film was thermally dried by placing the print into an oven set at 60° C. for three minutes. The resolubility of the thermally dried film was checked by wiping a soft cloth soaked in water across the surface. Finally, the print was UV cured by running the print through a conveyorised UV drier fitted with one 120 W/cm medium pressure mercury lamp at 25 m/min. The film properties were assessed by its resistance to double rubs of a soft cloth soaked with A) water and B) isopropyl alcohol. The ink film properties are detailed in Table 9.

TABLE 9

| Ink film properties | |
|---|---|
| Film water redispersibilty after thermal dry | Very poor, ink film breaks up into large particles after 5 rubs. |
| Isopropyl alcohol resistance after UV cure | 100 + double rubs |
| Water resistance after UV cure | 100 + double rubs |

As can be seen from the properties of Table 9, the ink of this comparative example could permanently block jets if a similar cleaning process were to be attempted owing to film breaking up into particulates.

What is claimed is:

1. An inkjet ink comprising: an aqueous polyurethane (meth)acrylate dispersion, which is redispersible in water in a single water rub after thermal drying and before curing; a water-dispersible or water-soluble photoinitiator; a surfactant; colouring agent; and a humectant; wherein the ink comprises less than 2% by weight (meth)acrylate radiation-curable material with a number average molecular weight of less than 1,200 Da, based on the total weight of the ink.

2. An inkjet ink as claimed in claim 1, wherein the polyurethane (meth)acrylate dispersion has a number average molecular weight of over 1,200 Daltons.

3. An inkjet ink as claimed in claim 1, wherein the colouring agent is a dispersible pigment.

4. An inkjet ink as claimed in claim 1, wherein the ink comprises 40 to 80% by weight of water, based on the total weight of the ink.

5. An inkjet ink as claimed in claim 1, wherein the ink further comprises a synthetic thickener.

6. An inkjet ink as claimed in claim 1, wherein the ink comprises less than 1% by weight (meth)acrylate radiation-curable material with a number average molecular weight of less than 1,200 Da, based on the total weight of the ink.

7. A cartridge containing the inkjet ink as claimed in claim 1.

8. A printed substrate having the ink as claimed in any of claim 1 printed thereon.

9. A printed substrate as claimed in claim 8, wherein the substrate is a food packaging.

10. A method of inkjet printing comprising inkjet printing the inkjet ink as claimed in claim 1 onto a substrate, drying and curing the ink.

11. A method as claimed in claim 10, wherein the substrate is a food packaging.

* * * * *